D. W. BAIRD.

CONCEALED JOINTED-BRACES FOR CARRIAGE-TOPS.

No. 7,859. Reissued Aug. 28, 1877.

Attest
Jucel Spaulding
R. E. White

Inventor:
David W. Baird,
per R. F. Osgood
Atty.

N. PETERS, PHOTO-LITHOGRAPHER, WASHINGTON, D. C.

UNITED STATES PATENT OFFICE.

DAVID W. BAIRD, OF GENEVA, NEW YORK.

IMPROVEMENT IN CONCEALED JOINTED BRACES FOR CARRIAGE-TOPS.

Specification forming part of Letters Patent No. 143,316, dated September 30, 1873; Reissue No. 7,859, dated August 28, 1877; application filed July 14, 1877.

*To all whom it may concern:*

Be it known that I, DAVID W. BAIRD, of Geneva, in the county of Ontario and State of New York, have invented a certain new and useful Improvement in Concealed Jointed Braces or Stays for Carriage-Tops; and I do hereby declare that the following is a full, clear, and exact description of the construction and operation of the same.

My invention consists of a concealed brace or stay for use between the two rear bows of a carriage-top, constructed and arranged as hereinafter described.

Figure 1:
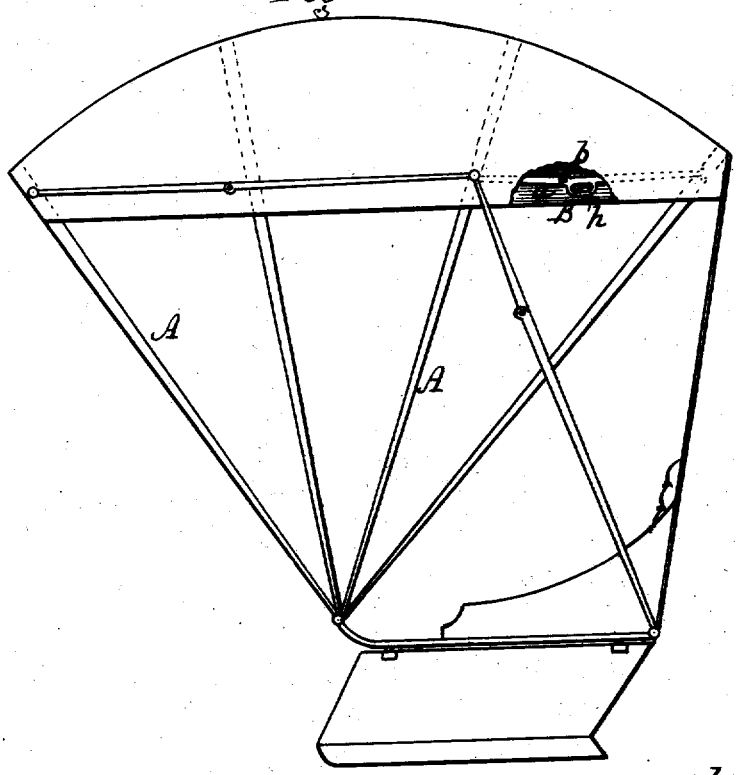
Figure 2:
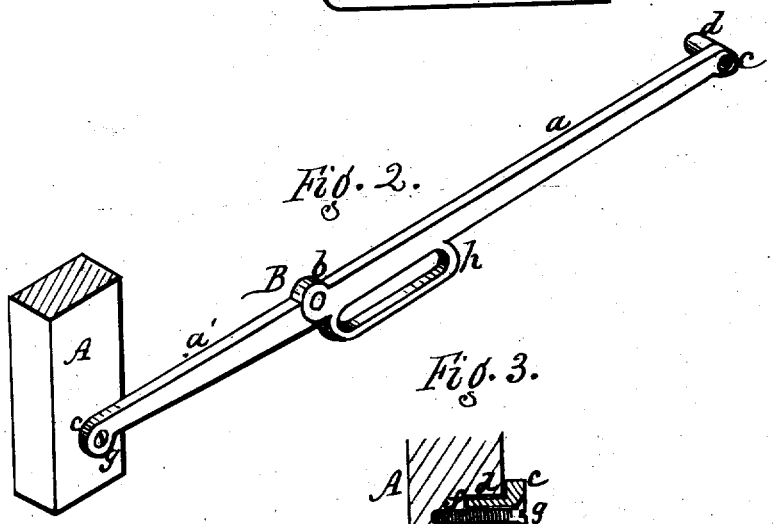
Figure 3:
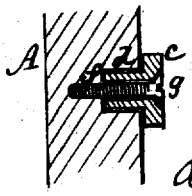

In the drawings, Figure 1 is an elevation of a carriage-top with my improvement applied thereto. Fig. 2 is a perspective view of the concealed brace or stay with joint. Fig. 3 is a section of one end of the device where it is jointed to the bow.

This device is for use between the two rear bows of the carriage-top, to prevent collapse and consequent wrinkling of the leather when the top is turned up or back.

A A represent the bows, and B the concealed brace or stay. This brace or stay is made up of two arms or levers, *a a'*, which are pivoted at *b*, one side of the center, and arranged to "break" or open downward. This pivot is formed solid on one half of the knuckle, and passed through the socket of the other and headed down; but, if desired, a separate pivot may be employed, passing through both halves of the knuckle.

The ends of the arms are made with enlarged heads *c c*, and projecting sockets *d d*, which stand inward and rest in holes *f f*, countersunk in the wood of the bows. They are secured in place by ordinary wood-screws *g g*, which pass through the heads and sockets and strike deep into the wood.

On the under side of the long lever *a* of the brace or stay is formed a handle, *h*, standing downward in the plane of the lever itself, and in a convenient position to be reached and operated by the hand. The brace or stay is located between the leather and the lining of the top, just far enough in to be covered from sight, but yet to be easily reached. It breaks or collapses downward, and is entirely distinct from the main props and lever-work which raise and lower the carriage-top, its object being simply to keep the top between the two rear bows extended and straight.

I am aware that braces or stays between the two rear bows have before been employed. The novel features of my invention consist in the breaking or opening of the stay downward, and the use of the handle *h* and the enlarged heads *c* and sockets *d*.

The handle is of such form that it lies concealed, as well as the levers, and it stands in the same plane with the levers, and does not project through to the inside of the top, and it furnishes a broad and convenient hold for the hand in operating it.

The sockets *d d* form stronger joints or bearings in the wood than screws alone, which have heretofore been used. Screws, by reason of their small size and insecure hold, soon break and tear out; but the sockets *d*, resting in the wood, constitute enlarged bearings, which form the joints, and receive the strain independent of the screws. The screws inserted through the sockets only serve to attach them, but receive little, if any, of the strain that comes upon the joint in opening and closing the levers. There is not only less strain and less liability to tear out by the use of this device, but a larger and much firmer joint is made, and the action is, therefore, much more uniform and even.

The importance of this feature will be perceived when it is considered that the ordinary projecting props cannot be used between the cover and lining for want of space; but the attachment must be made to the wood direct, so as to produce but little projection therefrom.

Simple wood-screws have been the best fastenings heretofore known.

This attachment may be made in the form of a separate and distinct article of manufacture, and furnished to the trade for sale to carriage-makers.

Having thus described my invention, I do not claim, broadly, a brace or stay between the two rear bows of the carriage-top; but

I claim—

1. The brace or stay B, consisting of the two levers *a a'*, pivoted at *b* to break or open downward, and provided with the depending handle *h*, as shown and described, and for the purpose specified.

2. The levers *a a'*, having the enlarged heads *c*, with lateral sockets *d*, for the purpose specified, the stay *a* being formed with the depending handle *h*, all constructed and arranged as and for the purpose specified.

In witness whereof I have hereunto set my hand this 20th day of June, 1877.

DAVID W. BAIRD.

In presence of—
NATHANIEL SAXTON,
O. F. HEARTWELL.